United States Patent [19]

Farrington

[11] Patent Number: 4,941,011
[45] Date of Patent: Jul. 10, 1990

[54] SINGLE INTEGRATOR SYSTEM WITH DUAL PHOTOCELLS

[75] Inventor: David L. Farrington, Boxborough, Mass.

[73] Assignee: Polaroid Corporation, Cambridge, Mass.

[21] Appl. No.: 360,790

[22] Filed: Jun. 2, 1989

[51] Int. Cl.$^5$ .................. G03B 7/087; G03B 7/099
[52] U.S. Cl. ................................. 354/430; 354/461; 354/460; 307/352
[58] Field of Search .............. 354/430, 433, 434, 436, 354/460, 461; 307/352, 353

[56] References Cited

U.S. PATENT DOCUMENTS

| | | | |
|---|---|---|---|
| 3,753,392 | 8/1973 | Land | 354/170 |
| 3,942,183 | 3/1976 | Whiteside | 354/29 |
| 4,192,587 | 3/1980 | La Rocque et al. | 354/414 |
| 4,357,083 | 11/1982 | Johnson et al. | 354/22 |
| 4,444,478 | 4/1984 | Kieth et al. | 354/417 |
| 4,491,406 | 1/1985 | Johnson | 354/436 |
| 4,651,034 | 3/1987 | Sato | 307/352 |

Primary Examiner—L. T. Hix
Assistant Examiner—Cassandra C. Spyrou
Attorney, Agent, or Firm—John J. Kelleher

[57] ABSTRACT

An exposure control circuit for a photographic apparatus that senses visible and infrared scene light with separate light sensing photodiodes employs a single integrator and a separate capacitor for the storage of each scene light integration to sequentially integrate the light levels sensed by such diodes in controlling the amount of image-carrying scene light admitted to the film plane of the apparatus through a scanning aperture. By utilizing a single integrator and separate storage capacitors for each light integration for such light control, a considerable amount of valuable space can be saved in, for example, an integrated circuit over a system where multiple integrators are employed for such purposes.

7 Claims, 3 Drawing Sheets

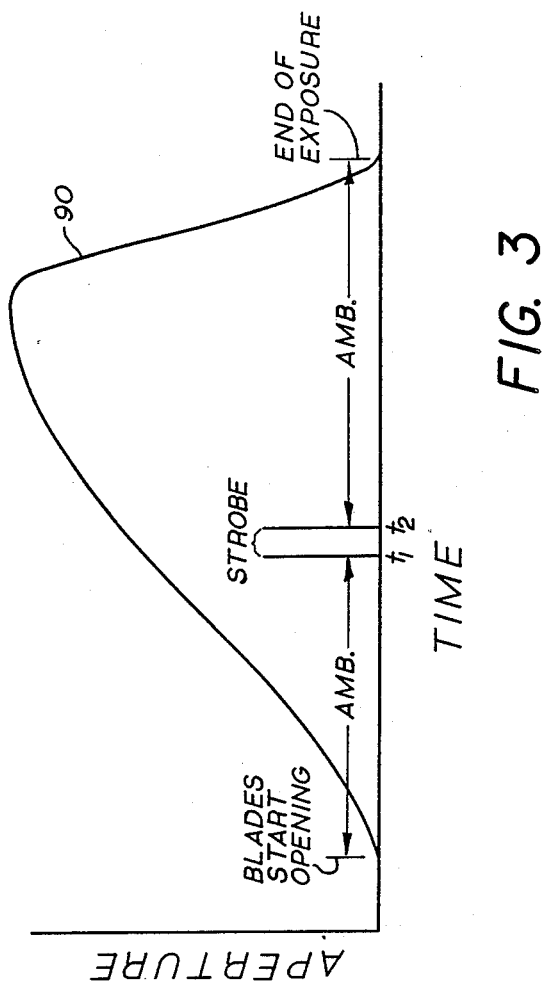

SINGLE INTEGRATOR SYSTEM WITH DUAL PHOTOCELLS

BACKGROUND OF THE INVENTION

1. Field of the Invention

The present invention relates to exposure control systems for photographic apparatus, in general, and to such systems employing separate photodetectors for sensing visible and non-visible electromagnetic frequencies for controlling the amount of image-carrying scene light admitted to the film plane of such apparatus, in particular.

2. Description of the Prior Art

Automatic light responsive exposure control systems are well known in the photographic arts and have been long used to control the duration of a photographic exposure. In addition, photographic apparatus incorporating an electronic flash, such as that described in U.S. Pat. No. 4,444,478 to Kieth et al, in common assignment herewith, having an exposure control system that employs separate ambient and artificial light sensors whose outputs are integrated by separate integrators for exposure interval and electronic flash light-output control purposes, respectively, are also well known in the photographic art.

For a number of reasons (e.g. cost, size, power consumption, etc.) the electrical circuitry employed in the above-noted exposure control systems are often formed in an integrated circuit (IC). An IC, in its most general state, is an interconnected array of active and passive elements integrated with or deposited on a single semiconductor substrate and capable of performing one or more electronic circuit functions. An integrator such as that mentioned above for integrating the light levels sensed by a photodetector requires a considerable amount of valuable space in an IC when formed as a portion thereof. The implementation of a function within an IC requiring an electronic circuit or circuits needing a relatively large amount of space, such as the just-mentioned photodetector integrator, may prevent the inclusion of additional functions within the same IC because of a lack of available space.

In one type of electronic flash camera such as that sold by Polaroid Corporation of Cambridge, MA under its Registered Trademark Impulse Autofocus, two photodetectors whose outputs are coupled to separate integrators are employed to measure visible and infrared (IR) scene light content during an exposure interval. The camera includes a quench strobe and a scanning blade shutter. The electronic flash illuminates the scene with artificial light a subject distance related time after the scanning shutter opens. The infrared photodetector measures the IR content of the electronic flash light reflected from the scene and the visible light photodetector measures the ambient scene light during an exposure interval.

Heretofore the use of a single integrator to integrate the amount of scene light sensed by two different light sensors was avoided because switching the integrator between light sensors would introduce ringing and/or noise into the integrator of a magnitude that would produce substantial scene light level integration errors. In the exposure control system employed in the above-noted Polaroid camera there is no need to switch one integrator between two photodetectors because, as noted, each photodetector output is integrated by a separate integrator. However, the IC in this particular camera has less space available to accommodate additional functions because of the presence in the IC of these two integrators.

SUMMARY OF THE INVENTION

It is a primary object of the present invention, therefore, to provide an exposure control circuit for a photographic camera having two or more photodetectors wherein the light levels sensed by each such photodetector are sequentially integrated by the same integrator for the collective control of an exposure control system.

It is another object of the present invention to provide an exposure control circuit for sequentially integrating the outputs of a plurality of photodetectors with a single integrator, storing each integration in a separate capacitor and make available the final value of each such integration during an exposure cycle, both separately and collectively, with a minimum of circuitry.

It is yet another object of the present invention to provide means for sequentially integrating the outputs of a plurality of photodetectors with a single integrator and storing each such integration in a separate storage capacitor without introducing errors into an integrated output of a photodetector.

It is a further object of the present invention to provide an exposure control circuit for a photographic camera with two or more photodetectors with integrating means that will consume a minimum amount of space in a integrated circuit.

Other objects, features and/or advantages of the present invention will be readily apparent from the following detailed description of a preferred embodiment thereof when taken in conjunction with the accompanying drawings.

In accordance with a preferred embodiment of the present invention, an exposure control circuit for a photographic apparatus is provided that includes separate photodetectors for sensing visible and non-visible electromagnetic frequencies reflected from a scene to be photographed and for generating a signal representative thereof. The circuit includes a common integrator for integrating the output signal of each such photodetector and at least a separate capacitor for each integration to be performed by said integrator during a photographic apparatus operational cycle. Means are provided for interconnecting each said capacitor and said common integrator such that each photodetector signal integration by said integrator is stored in a different capacitor and such that said stored integrated signals are separately available for exposure control purposes during said operational cycle, and collectively form a signal representative of the total amount of sensed visible and non-visible electromagnetic frequencies reflected from the scene to be photographed.

BRIEF DESCRIPTION OF THE DRAWINGS

FIG. 3 is a graph showing the primary or taking aperture size variation and strobe firing as a function of time, during an exposure interval.

DETAILED DESCRIPTION OF THE PREFERRED EMBODIMENT

Figure 1:
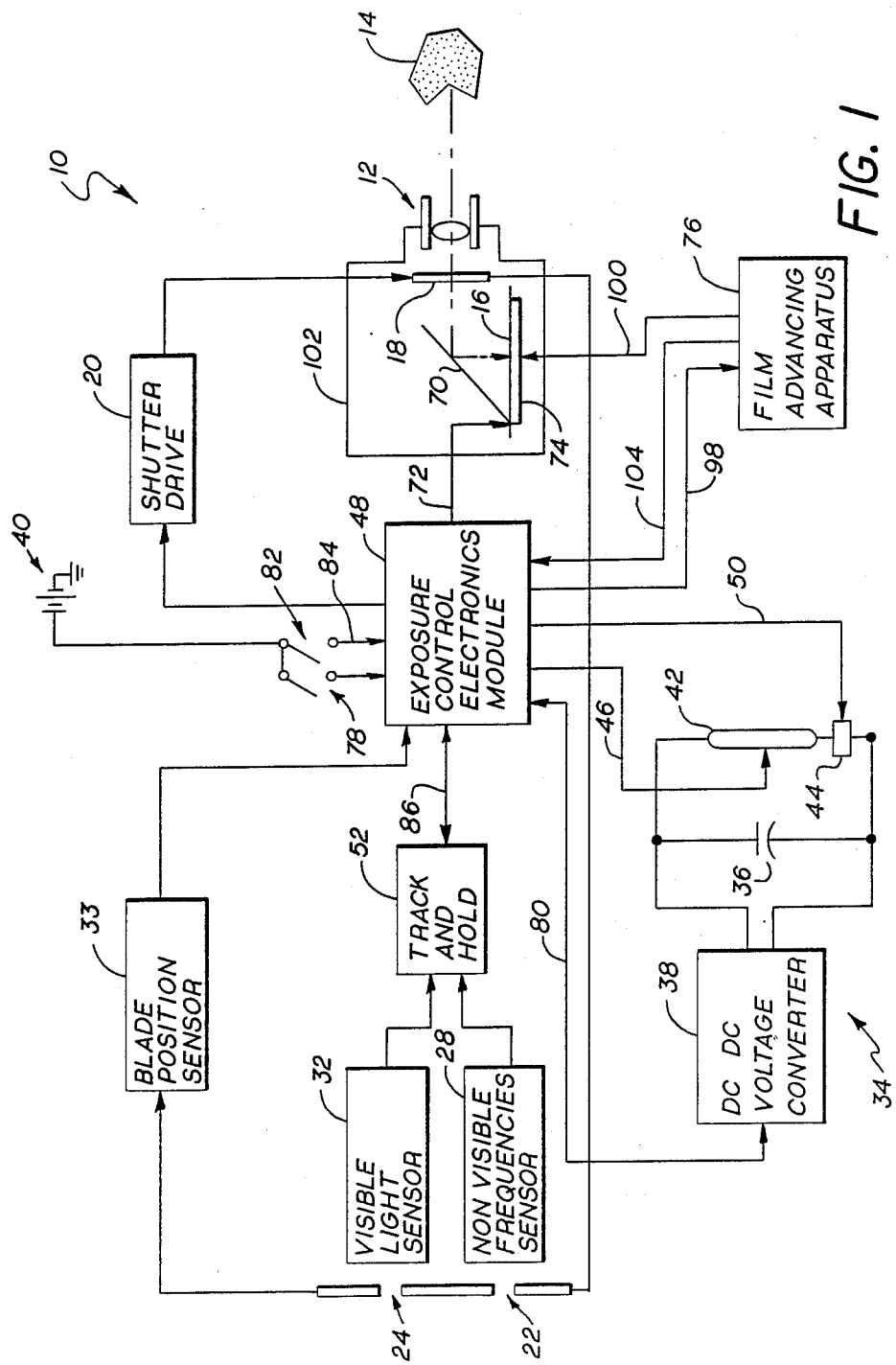
FIG. 1 is a schematic diagram of a photographic camera which incorporates a preferred embodiment of the exposure control circuit of the present invention.

Referring now to the drawings, and specifically to FIG. 1, there is shown a single lens reflex (SLR) photographic camera 10 of the self-developing type which incorporates a preferred embodiment of an exposure control circuit of the present invention. The camera 10 includes an objective or taking lens 12, of the fixed focus type, that may include one or more elements (only one shown) for focusing image-carrying light rays of, for example, an object 14 onto a film plane 16 through an aperture (not shown) formed in a shutter blade mechanism or assembly 18.

The blade mechanism 18, positioned intermediate of the lens 12 and the film plane 16, includes a pair of overlapping shutter blade elements (not shown) of the "scanning" type. Scene light admitting primary apertures (not shown) are provided in each blade mechanism element to cooperatively define a progressive and predictable variation of effective aperture openings in accordance with simultaneous longitudinal and lateral displacement of one blade element with respect to the other blade element in a manner more fully described in commonly assigned U.S. Pat. No. 3,942,183 to Whiteside, now specifically incorporated herein by reference. The blade element apertures are selectively shaped so as to overlap the central optical axis of the lens 12 thereby defining a gradually varying effective aperture size as a function of the positions of the blade elements of the blade mechanism 18. A shutter drive 20 is provided for displacing the blade elements of the blade mechanism 18. The shutter drive 20 includes a tractive electromagnetic device in the form of a solenoid (not shown) employed to displace the shutter blade elements with respect to one another in a manner more fully described in the above-cited Whiteside patent.

Each of the blade elements of the blade mechanism 18 includes two secondary apertures. A secondary aperture in a first blade element cooperates with a secondary aperture in a second blade element to form an opening 22 through the shutter mechanism 18. Another secondary aperture in the first blade element cooperates with another secondary aperature in the second blade element to form an opening 24 through the shutter mechanism 18. These cooperating secondary apertures may be configured to track in a predetermined corresponding relationship with respect to the primary scene light admitting apertures of the shutter mechanism 18. With the primary and secondary apertures being formed in the same blade element and therefore being mechanically coupled to one another, it is readily apparent that the secondary apertures can move in the same manner as the primary apertures when the blade elements of the blade mechanism 18 are displaced, in the above-described manner, with respect to one another.

The amount of artificial light admitted to the film plane 16 through the primary apertures of the shutter mechanism 18 is controlled by a signal generated by an infrared photodetector 26 (FIG. 2) within a non-visible frequencies sensor 28 that senses a corresponding amount of infrared scene energy through the opening 22. The amount of visible light admitted to the film plane 16 through the primary apertures of the shutter mechanism 18 is controlled by a signal generated by a visible light photodetector 30 (FIG. 2) within a visible light sensor 32 that senses a corresponding amount of ambient light, through the opening 24. An example of scanning blade elements having primary and secondary apertures that cooperate to control the amount of scene light admitted to a film plane is shown in U.S. Pat. No. 3,942,183 supra.

The camera 10 is provided with a conventional blade position sensor 33 that senses when the taking aperture in the blade mechanism 18 first begins to open to initiate an exposure interval and generates a signal representative of such initial opening. The camera 10 is also provided with an electronic flash apparatus 34 together with apparatus for controlling its energization in order to provide a portion of the exposure value to illuminate a scene to be photographed. The electronic flash apparatus 34 comprises a main storage capacitor 36 which may be charged up to an operating voltage by any conventional voltage converter circuit (not shown) which would be included within a DC-DC voltage converter 38. The DC-DC voltage converter 38 operates in a conventional manner to convert a DC voltage as may be derived from a battery 40 of the camera 10, which can be in the order of 6 volts, to a suitable operating voltage such as 280 volts. A flash tube 42 and a current interrupting thyristor 44 are connected in a series relation and collectively in parallel with respect to the main storage capacitor 36. The flash tube 42 may be energized by a suitable trigger signal on a path 46 from a conventional trigger circuit (not shown) within an exposure control module 48, and the thyristor 44 may be triggered to interrupt current through the flash tube 42 by a suitable trigger signal on a path 50 from another conventional trigger circuit (not shown) that is also included within the exposure control electronics module 48. When energized, the flash tube 42 illuminates the scene and subjects included therein with both visible and non-visible electromagnetic frequencies.

The camera 10 further includes a photodetector track and hold circuit 52, preferably formed as a part of an integrated circuit, whose function is the ultimate control of the shutter mechanism drive 20. With additional reference to FIG. 2 of the drawings, the track and hold circuit 52 includes a single or common integrator 54 that alternately sums or integrates the non-visible and visible electromagnetic frequencies sensed by the photodetectors 26 and 30, respectively, and separately stores each such integration in a network of storage capacitors 56 during each exposure cycle.

The photodetectors 26 and 30 are alternately coupled to the input of an amplifier 58 through paths 60 and 62 and switches S1 and S2, respectively. The amplifier 58 is of a type sometimes referred to in the art as an "operational amplifier" which may be of a differential variety. When considered ideally, the amplifier 58 has infinite gain and infinite input impedance and a zero output impedance. In addition, the operational amplifier 58 is energized to operate from the battery 40 by means of an interconnecting supply line 64 and a ground line 66.

By virtue of a feedback path comprising an integration capacitor C1 connected between the input line 60 and an output line 68 from the operational amplifier 58, the photodetectors 26 and 30 are permitted to operate into an apparent low-input impedance so as to function in a current mode, the currents generated by the photodetectors 26 and 30 being limited substantially only by their own internal impedance. Thus, under such loading, the photodetectors 26 and 30 alternately and in conjunction with the operational amplifier 58 and integration capacitor C1 are capable of providing a desirable linear output corresponding to the time integration of the non-visible and visible scene light incident on the photodetectors 26 and 30, respectively. Switches S3 and S4 are momentarily and concurrently actuated to their closed positions in order to discharge the integration capacitor C1 prior to each photodetector output integration to thereby prevent the introduction of integration errors that would otherwise result if any residual charge remained on the capacitor C1 prior to each such integration.

The storage capacitor network 56 includes storage capacitors C2 and C3 and network interconnecting switches S5, S6, S7, S8, S9 and S10. These switches are activated in various combinations, to either discharge the storage capacitors C2 or C3 prior to storing an integrated visible or non-visible light signal therein, to prevent the introduction of errors into an integrated signal as in the acutation of the switches S1 and S2 with respect to the capacitor C1, or for the storage of an integrated signal.

As noted above, the camera 10 is of the SLR type and therefore includes a conventional reflex mirror 70 that is actuatable by the exposure control electronics module 48 through a path 72. The mirror 70 is actuatable, in a conventional manner, between a viewing position where it blocks the transmission of scene light to the film plane 16 and where a camera operator can view a scene to be photographed through the lens 12, and a taking or unblocking position as shown in FIG. 1, where it facilitates the transmission of scene light to the film plane 16 during an exposure interval.

The camera 10 is preferably designed for use with a self-developing film unit (not shown) similar to those described in U.S. Pat. No. 3,415,644 to Land, in common assignment herewith. The self-developing film unit is packaged in a lighttight film cassette 74 shown in the condition assumed just after the cassette 74 has been fully inserted into the camera 10. The cassette 74 may enclose the 6 VDC battery 40.

Mounted within the camera 10 is a film advancing apparatus 76 similar to that described in U.S. Pat. No. 3,753,392 to Land that includes a motor for operating a gear train (neither shown) which is coupled with the film advancing apparatus 76 to provide for the continuous movement of an exposed film unit from an exposure position within the camera 10 toward the exterior thereof. The film advancing apparatus 76 additionally includes a film-engaging arm member (not shown) driven by the above-mentioned motor and gear train. The arm is adapted to extend into a slot in the cassette 74, as shown in the above-noted Land U.S. Pat. No. 3,753,392, and engage the uppermost film unit located therein at or near its trailing edge prior to moving it out of the cassette 74 and into the bite of a pair of conventional processing rollers (not shown). The processing rollers, which are rotated by the motor and gear train mentioned above, continue the interrupted movement of the exposed film unit toward the exterior of the camera 10 while simultaneously rupturing a container of processing liquid at the leading end of the exposed film unit. The processing rollers spread the liquid contents of the ruptured container between elements of the film unit to initiate formation of a visible image within the film unit in a manner that is well known in the art.

OPERATION

A typical exposure cycle will now be described in detail. For the purpose of this description it is assumed that the taking aperture of the blade mechanism 18 is in its fully opened position, that the openings 22 and 24 formed by the secondary apertures in the blade mechanism 18 are also in their fully opened positions, that the camera 10 and the flash apparatus 34 have been energized by the prior closure of a switch 78 that coupled the battery 40 to the camera 10 and to the DC-DC voltage converter 38 through the exposure control module 48 and a path 80 and that the main storage capacitor 36 is fully charged and is ready for the initiation of an exposure cycle. With continued reference to FIGS. 1 and 2, and with additional reference to FIG. 3 which is a graph of effective primary aperture area and therefore of ambient and artificial scene light incident on the film plane 16 as a function of time, a switch 82 is actuated to its closed position by a camera operator to initiate the exposure cycle. The closure of the switch 82 applies an exposure cycle initiation signal to the exposure control electronics module 48 through a path 84. The photodetector 30 within the visible light sensor 32 senses the ambient scene brightness level. This brightness level signal is summed by the integrator 54 within the track and hold 52 and is then routed to the exposure control electronics module through the path 86 where it stored for subsequent use by the exposure control system. The exposure control electronics module 48 then energizes the shutter drive 20 to actuate the blade mechanism 18 and therefore the primary or taking aperture together with the openings 22 and 24 formed by the secondary apertures in the blade mechanism 18 to their fully closed positions. Subsequent to closing the opening 22 and prior to the start of an exposure interval the shutter drive 20 causes the opening 22 to increase in size toward its fully opened position. While the opening 22 is being moved toward its fully opened position, the exposure control electronic module 48 actuates means (not shown) that, in turn, actuates the mirror 70 through the path 72 from its viewing or light blocking position, where it precludes the transmission of image-carrying light rays to the film plane 16, to its light unblocking position (as shown in FIG. 1) where it facilitates the transmission of image-carrying light rays to the film plane 16 during an exposure interval.

In addition to the above, the closure of the switch 82 causes the exposure control electronics module 48 to actuate the track and hold circuit 52 through a path 86 that, in turn, causes the switches S3 and S4 to close to ensure that the integration capacitor C1 is fully discharged before starting an integration cycle. Switches S8, S9 and S10 are also closed by such track and hold circuit 52 actuation to ensure that the storage capacitor C2 and C3 are fully discharged prior to an integration cycle. Discharging the capacitors C1, C2 and C3 at this time avoids the possibility of any residual charge remaining therein causing an exposure error.

When the opening 22 adjacent the non-visible frequencies sensor 28 in its fully opened position the exposure control electronics module 48 triggers the flash tube 42 through the path 46 to thereby illuminate the scene to be photographed with light containing both visible and non-visible frequencies prior to the initiation of an exposure interval. The exposure control electronics module 48 then triggers the thyristor 44 through the path 50, 35 microseconds after triggering the flash tube 42 to thereby extinguish the light output of the flash tube 42. The non-visible frequencies portion of this 35 microsecond flash of energy reflected from a subject is sensed by the infrared photodetector 26 (FIG. 2) which is within the non-visible frequencies sensor 28, through the opening 22 formed by the secondary apertures in the blade mechanism 18. An output signal representative of the amount of energy sensed by the infrared photodetector 26 is summed by the integrator 54 within the track and hold 52 and is routed to the exposure control electronics module 48 through the path 86 for storage therein. The integrated value of this signal is a measure of subject reflectivity. A more detailed description of a pre-exposure flash ranging system of this type is provided in U.S. Pat. No. 4,357,083 to Johnson et al., the entire disclosure of which is specifically incorporated herein by reference.

After a signal representative of subject reflectivity has been derived by the above described pre-exposure flash ranging system the exposure control electronics module 48 once again actuates the shutter drive 20 to initiate an exposure interval. The exposure control system causes the size of the taking aperture of the blade mechanism 18 to vary in accordance with a curve 90 as shown in drawing FIG. 3.

The exposure control system employed herein is of the proportional fill flash type such as that described in commonly assigned U.S. Pat. No. 4,192,587 to La Rocque et al., the disclosure of which is specifically incorporated herein by reference. In this exposure control system the exposure control electronics module 48 once again triggers the flash tube 42 through the path 46 at a subject reflectivity related time $t_1$ to illuminate the scene being photographed with artificial light and then triggers the thyristor 44 at time $t_2$ through the path 50 to thereby extinguish the light output of the flash tube 42. As explained in the above-noted La Rocque et al. patent, the total amount of image-carrying light transmitted to the film plane 16 is comprised of both artificial and ambient light. The flashtube 42 is fired at full output at the subject distance related time $t_1$, and is extinguished at the time $t_2$ which will enable the flashtube 42 to provide a predetermined percentage (preferably 25 percent) of the total scene illumination. The remaining portion (75 percent) of the total scene illumination is provided by ambient scene light.

The ambient scene light is sensed by the visible frequencies sensor 32 through the opening 24 at first light or when the primary aperture starts to open as determined by the blade position sensor 33 through time $t_1$ and from $t_2$ through the end of exposure. The artificial scene light is sensed during the exposure interval between times $t_1$ and $t_2$ by sensing the infrared portion thereof with the non-visible frequencies sensor 28 through the opening 22. The ambient and artificial light respectively sensed by the sensors 32 and 28 are sequentially integrated and their integrated values stored by the track and hold system 52.

Figure 2:
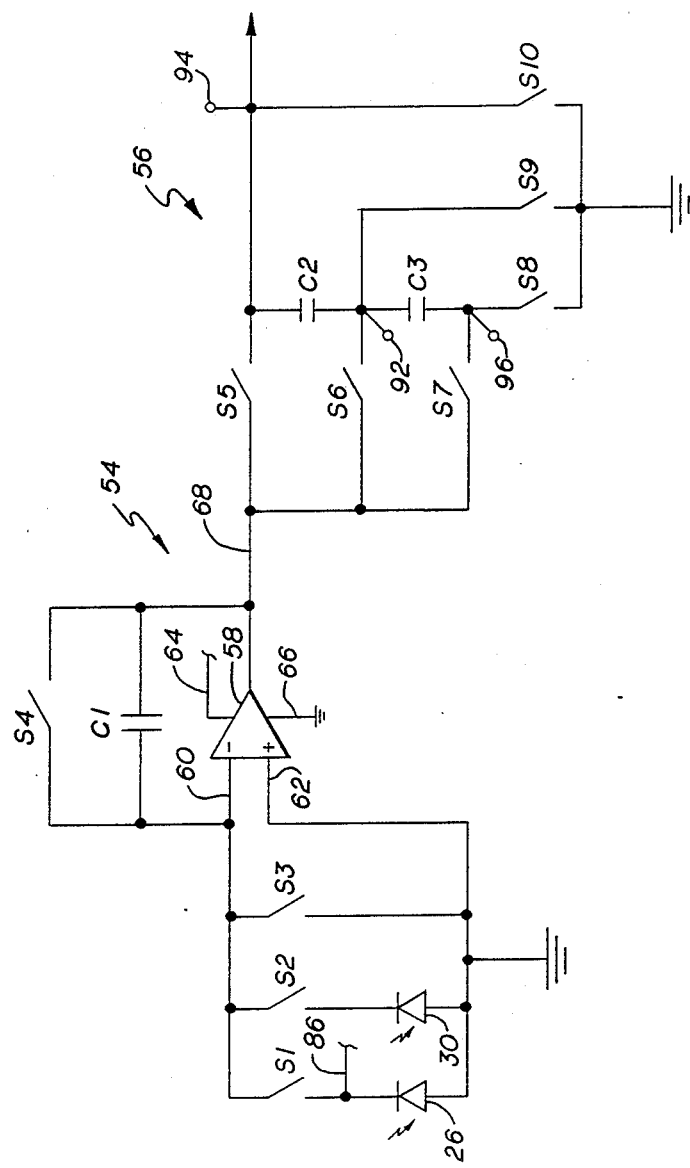
FIG. 2 is a schematic diagram of a pair of photodetectors and the exposure control circuit forming a part of the exposure control system of the photographic camera of FIG. 1.

The track and hold system 52 functions in the following manner. With particular reference to FIG. 2 of the drawings, switches S3, S4, S8, S9 and S10 are closed before the exposure cycle begins to ensure that capacitors C1, C2 and C3 are fully discharged for the reason mentioned above. Also, the switches S5, S6 and S7 are opened to isolate the storage capacitors C2 and C3 from the integrator 54, and switches S1 and S2 are respectively opened and closed at this time.

To prepare for integrating ambient scene light generated current from the photodetector 30, the switch S4 is opened to remove the current-discharging short circuit across the integrations capacitor C1 and the switch S10 is opened to release the current-discharging short circuit across the storage capacitor C2. After a short delay to allow the noise that is generated by actuating the above-mentioned switch to settle, the integrator 54 and the storage capacitor C2 are enables by opening the switch S3 and closing the switch S5, respectively. The integrator 54 wil now integrate the output current of the ambient light photodetector 30. In this configuration the voltage across the storage capacitor C2 will equal the voltage at the integrator output 68.

When this first integration of ambient light is complete, which occurs at the time $t_1$ (FIG. 3), the exposure control electronics module 48 will instruct the track and hold system 52 to switch from the ambient light photodetector 30 to the infrared photodetector 26. The first step in this sequence is to open the switch S5 which disconnects the storage capacitor C2 from the integrator 54. This prevents any noise at the integrator output 68 from affecting the integrated voltage on the storage capacitor C2. Switch S2 is then opened and the switch S1 is closed thereby connecting the infrared photodetector 26 to the input of the integrator 54. At the same time, the integrator capacitor C1 is discharged by closing the switches S3 and S4. While this is happening, the switch S9 is opened thereby removing the bottom of the storage capacitor C2 at a terminal 92 from ground. Once integration capacitor C1 is discharged, the switch S4 is opened. Thereafter, the switch S3 is opened which re-enables the integrator 54. The storage capacitor C3 is also enabled at this time by closing the switch S6.

With the system in this configuration integrator 54 integrates the output of the infrared photodetector 26 between the times $t_1$ and $t_2$. This integrated photodetector 26 output appears at a terminal 92 between the storage capacitors C2 and C3, and is therefore stored on the storage capacitor C3. At this point in time the voltage at an output terminal 94 of the track and hold system 52 is the sum of the ambient light related signal generated by the ambient light photodetector 30 between first light and $t_1$ and the infrared light related signal generated by the infrared photodetector 26 between the times $t_1$ and $t_2$.

After the integration of infrared scene light is complete, ambient light photodetector 30 is enabled for the final integration or the integration of ambient scene light between the time $t_2$ and the end of exposure. The first step in this final integration is to open the switch S6. Once again a previously stored voltage (the scene light voltages stored on storage capacitors C2 and C3) is disconnected from the integrator 54 and is so immune from spurious signals generated by the various switches, while the integrator 54 is being reconfigured. The switches S3 and S4 are then closed to discharge the integration capacitor C1. Also, the switch S1 is opened and the switch S2 is closed thereby disconnecting the photodetector 26 from and reconnecting the photodetector 30 to the input of the integrator 54. When integration capacitor C1 is fully discharged, the switches S4 and S8 are opened. The track and hold system 52 is then re-enabled by opening the switch S3 and closing the switch S7. As the voltage on integration capacitor C1 and at the output 68 of the integrator 54 rises, the voltage at a terminal 96 at the bottom of the storage capacitor C3 will rise to the same level. Since the storage capacitor C2 is already charged with the final value of the first integration and the storage capacitor C3 is charged with that of the second integration the voltage at the output 94 of the track and hold system 52 will be the sum of the three capacitors C1, C2 and C3. When a comparator (not shown) within the exposure control electronics module 48 determines, through the path 86, that the sum of the voltage on the capacitors C1, C2 and C3 equal a magnitude indicating that a film unit at the film plane 16 of the camera 10 has been fully exposed, the module 48 actuates the shutter drive 20 to close the taking aperture in the blade mechanism 18 to thereby terminate the exposure interval. It should be noted that the integrated signals stored on the capacitors C1, C2 or C3 are both collectively available on the terminal 94, and separately available on the terminals 92, 94 or 96 at various times during each exposure cycle.

At the completion of the exposure interval the exposure control electronics module 48 actuates the mirror 70 towards it light-blocking position, and actuates the film advancing apparatus 76 and the drive motor (not shown), through a path 98, to initiate the transport and processing of an exposed, self-developing film unit. The film advancing apparatus, in turn, moves the exposed film unit located in the cassette 74, through a path 100, into the bite of the pair of adjacent processing rollers (not shown), in the manner described above, to spread processing liquid between certain film layers and to move the exposed film unit toward an exit slot (not shown) in a housing 102 of the self-developing camera 10. After the mirror 70 has been actuated to its light-blocking position where it precludes the passage of light to the film plane 16, the exposure control electronics module 48 actuates the shutter drive 20 and the shutter mechanism 18 coupled thereto such that the primary or taking aperture thereof is placed in its fully opened position. After the film advancing apparatus 76 has moved the exposed film unit through the above-mentioned pair of rollers, a film movement completion signal is routed to the exposure control electronics module 48 through a path 104. Upon receipt of this signal and when the main storage capacitor 36 of the electronic flash apparatus 34 is fully charged, as sensed through the path 80, and the exposure control electronics module 48 places the exposure control system of the camera 10 in condition for the initiation of the next exposure cycle.

From the foregoing description of the invention it will be apparent to those skilled in the art that various improvements and modifications can be made in it without departing from its true scope. The embodiment described herein is merely illustrative and should not be viewed as the only embodiment that might encompass the invention.

What is claimed:

1. An exposure control circuit for a photographic apparatus, comprising:
    a pair of photodetectors for respectively sensing visible and non-visible electromagnetic frequencies reflected from a photographic scene and for generating a signal representative thereof;
    a common integrator for alternately integrating each said photodetector signal;
    a plurality of capacitors at least equal to the number of integrations to be preformed by said integrator during an operational cycle of said photographic apparatus; and
    means for interconnecting said capacitors and said common integrator such that each photodetector integration by said common integrator is stored in a different one of said capacitors and such that said stored integrated signals collectively form a signal representative of the total amount of sensed visible and invisible frequencies reflected from the photographic scene.

2. The exposure control circuit of claim 1 wherein said common integrator includes a combination operational amplifier and an integration capacitor and said interconnecting means includes means for interconnecting said integration capacitor with said plurality of capacitors while an integrated photodetector signal is present thereon to collectively form said signal representative of the total amount of visible and non-visible electromagnetic frequencies reflected from said photographic scene.

3. The exposure control circuit of claim 1 wherein said interconnecting means further includes means for making each stored integration separately available for exposure control purposes during an operational cycle of said photographic apparatus.

4. The exposure control circuit of claim 1 wherein one of said photodetector pair senses visible light and the other of said photodetector pair senses infrared light.

5. The exposure control circuit of claim 1 wherein said photographic apparatus incorporates an exposure cycle and said common integrator integrates said visible electromagnetic frequencies signal during a first portion of said exposure cycle, integrates said non-visible electromagnetic frequencies signal during a second portion of said exposure cycle and integrates said visible electromagnetic frequencies signal during a third portion of said exposure cycle.

6. A method of generating a signal representative of the total amount of visible and invisible electromagnetic frequencies reflected from a photographic scene with an exposure control circuit employing a pair of photodetectors responsive to visible and non-visible electromagnetic frequencies, respectively, a common integrator and a plurality of capacitors, comprising the steps of:
    sensing visible and non-visible electromagnetic frequencies reflected from said photographic scene with said photodetectors and generating signals representative thereof;
    alternately integrating each said photodetector signal with said common integrator; and
    interconnecting said plurality of capacitors and said common integrator such that each photodetector integration by said common integrator is stored in a different capacitor and such that said stored integrated signals collectively form a signal representative of said total amount of visible and non-visible electromagnetic frequencies reflected from said photographic scene.

7. The method of claim 6 wherein said common integrator includes a combination operational amplifier and an integration capacitor and said step of interconnecting said plurality of capacitors and said common integrator includes the additional step of interconnecting said integration capacitor with said plurality of capacitors while an integrated photodetector signal is present thereon to collectively form said signal representative of the total amount of visible and non-visible electromagnetic frequencies reflected from said photographic scene.

* * * * *